3,060,086
ANTI-DIARRHEA COMPOSITION
Kenneth E. Kueter, Lake Forest, Ill., assignor to Abbott Laboratories, North Chicago, Ill., a corporation of Illinois
No Drawing. Filed July 21, 1958, Ser. No. 749,590
9 Claims. (Cl. 167—53)

The present invention relates to a therapeutic composition useful in the treatment of warm-blooded animals and more particularly to an improved therapeutic composition for the treatment of diarrhea and related malabsorption syndromes in warm-blooded animals.

Commercial rabbit breeders, for example, find that diarrhea is by far the most serious ailment encountered in raising domestic rabbits and is responsible for more fatalities than all other causes combined. Heretofore, approximately 25% of all diarrhea cases in young rabbits resulted in death and a still larger percentage of rabbits recover only after a prolonged recuperation from the dehydration and emaciation accompanying the diarrhea. There are several known causes of diarrhea in rabbits and other warm-blooded animals, including abrupt changes in food and drinking water composition. Since the foregoing causes can generally be controlled, the more serious causes are pathogenic agents, such as mucoid enteritis, which especially affects pre-weaning litters, and the air-borne mocroorganisms which are most difficult to control even with the use of ultra-violet lights throughout the rabbit rooms.

It is therefore an object of the present invention to provide an improved composition of matter for the treatment of diarrhea and related malabsorptive syndromes in warm-blooded animals.

It is also a specific object of the invention to provide a more effective means for treating the intestinal tract with antibiotics.

Other objects of the invention will be apparent from the following detailed description and the claims to follow.

It has generally been found that most antibiotics are of little value in the treatment of diarrhea. Certain antibiotics actually induce diarrhea as a result of significantly altering the flora in the intestinal tract. Streptomycin has shown some indications of having specific utility against diarrhea due to Salmonella and Shigella organisms.

It has now been found that the antibiotic erythromycin normally having no utility in the treatment of diarrheas, when combined with compounds having opium or opium alkaloidal activity, such as paregoric and morphine sulfate, is remarkably effective in controlling diarrhea in warm-blooded animals, such as rabbits, dogs and monkeys. The combination of the antibiotic erythromycin and opium or opium alkaloids has been found to reduce the fatalities of young rabbits having diarrhea from about 25% to less than 10%, with over 80% of the rabbits recovering after only two feedings of the new composition. The utility of the present composition in human beings has not been established.

The following specific examples are for the purpose of illustrating the present invention and are not to be construed to limit the invention to the precise proportions and composition specified.

*Example I*

A suspension is prepared comprising a uniformly dispersed mixture of 25 cc. of paregoric (camphorated, U.S.P. tincture of opium) and 75 cc. of an aqueous suspension of erythromycin containing about 3% (w./v.) erythromycin having an activity of about 600 u./mg.

The erythromycin aqueous suspension has the following specific composition in the preferred embodiment:

| | Grams |
|---|---|
| Erythromycin stearate (600 u./mg.), 100 mg./5 cc. dose | 33.33 |
| Aseptoform M, 0.1% | 1.0 |
| Aseptoform P, 0.02% | .2 |
| Sodium citrate, gran., 10.0% | 100.00 |
| Sodium carboxymethylcellulose, 0.3% | 3.0 |
| Veegum (complex magnesium, aluminum silicate), 1.0% | 10.0 |
| Duponol P.C., 0.1% | 1.0 |
| Sugar, cane, 75.0% | 750.0 |
| Dye, Bright Orange, 0.002% | .02 |
| Oil, cassia, 0.12% | 1.20 |

Distilled water q.s. 1000 cc.

The foregoing composition provides 100 mg. erythromycin and 5.38 mg. of opium per 5 cc. dose.

*Example II*

A palatable stable aqueous suspension having the following composition is prepared:

| | Mg./cc. |
|---|---|
| Erythromycin stearate (600 u./mg.) | 20 |
| Morphine sulfate | 5.0 |
| Concentrated beef extract (bacto-beef extract Difco) | 100 |
| Aseptoform | 6.0 |
| Benzoic acid | 2.0 |
| Mono-sodium glutamate | 1.0 |

Tragacanth (2% aqueous solution) q.s. 1000 cc.

The latter composition is particularly designed for administration to dogs and monkeys, since the palatable nature of the composition makes it particularly acceptable to the animals and eliminates the necessity of oral intubation.

It should be understood that whereas the prior specific examples have shown the composition as a fluid suspension, the present invention also contemplates providing the improved antidiarrhea composition in the form of a tablet or dry mix in which the erythromycin is present as the free base or as a salt in an amount between about 25 mg. and 200 mg. uniformly admixed with morphine sulfate in an amount between about 7.5 mg. and 15 mg. as a dosage form. The tablets can be suitably flavored or coated as desired.

And, whereas the aqueous suspensions set forth in the specific examples employ the relatively insoluble erythromycin salt, erythromycin stearate, other relatively insoluble salts of erythromycin, such as erythromycin thiocyanate can be used. Where the suspension is prepared by adding water to the dry ingredients relatively soon before administration or when a solid dry mixture is used, the more soluble known non-toxic salt of erythromycin or erythromycin base can be employed.

While the combination of a relatively insoluble erythromycin salt and paregoric or morphine sulfate is particularly effective, it should be understood that the present invention also contemplates the use of other alkaloids of opium such as codeine, papaverine and heroin which can also be combined with erythromycin in substantially the same proportions as in Examples I and II.

The compositions of the present invention are preferably administered to the warm-blooded animals so that between about 1 and 20 mg. of erythromycin and between about .2 and 5 mg. of opium or an opium alkaloid, such as morphine sulfate, are administered per pound of animal, with the larger animals receiving the lower level of the drugs per pound of weight. A typical oral dose of the composition of Example I would be 2.5 cc. for an average (5-7 pound) rabbit and 5 cc. for a small (10 pound) dog. Dosage levels can be adjusted and doses repeated as required.

Others may readily adapt the invention for use under various conditions of service, by employing one or more of the novel features disclosed or equivalents thereof. As at present advised with respect to the apparent scope of my invention, I desire to claim the following subject matter:

1. A therapeutic composition useful for the treatment of diarrhea comprising a uniformly dispersed mixture of erythromycin and opium.

2. A therapeutic composition useful for the treatment of diarrhea comprising a uniformly dispersed mixture of erythromycin and an opium alkaloid having antidiarrheal activity.

3. A therapeutic composition useful for the treatment of diarrhea comprising a uniformly dispersed mixture of erythromycin and paregoric.

4. A therapeutic composition useful for the treatment of diarrhea comprising a uniformly dispersed mixture of erythromycin and morphine sulfate.

5. A therapeutic composition useful for the treatment of diarrhea comprising a stable fluid suspension of erythromycin and morphine sulfate, said morphine sulfate being present in about one part by weight for every five parts by weight of the erythromycin.

6. A therapeutic composition useful for the treatment of diarrhea comprising a stable fluid suspension of erythromycin stearate and opium, said erythromycin being present in an amount sufficient to provide at least about 1.0 mg. per cc. and said opium being present in an amount sufficient to provide at least about 0.2 mg. per cc.

7. A method of rendering erythromycin effective for treatment of diarrhea which comprises admixing opium with erythromycin.

8. A method of rendering erythromycin effective for treatment of diarrhea which comprises admixing paregoric with erythromycin.

9. A method of rendering erythromycin effective for the treatment of diarrhea which comprises admixing erythromycin with morphine sulfate in an amount providing about one part by weight of said morphine for every five parts by weight of erythromycin.

References Cited in the file of this patent

Quarterly Cumulative Index Medicus, 1953, p. 597.
U.S. Dispensatory, 25th ed., 1955, Lippincott Co., Phila., Pa., pp. 932 and 933.
Herrell: Erythromycin Antibiotics Monograph No. 1, 1955, Medical Encyclopedia, Inc., N.Y., N.Y., pages 46–50, pages 48–50 relied upon.
U.S. Dispensatory, 25th edition, 1955, Lippincott Co., Phila., Pa., pages 866–868.